(12) United States Patent
Li et al.

(10) Patent No.: US 9,916,023 B2
(45) Date of Patent: Mar. 13, 2018

(54) TOUCH DISPLAY PANEL AND TOUCH DISPLAY DEVICE

(71) Applicants: Shanghai Tianma Micro-Electronics Co., Ltd., Shanghai (CN); Tianma Micro-Electronics Co., Ltd., Shenzhen (CN)

(72) Inventors: Gujun Li, Shanghai (CN); Xingyao Zhou, Shanghai (CN); Kang Yang, Shanghai (CN); Yungang Sun, Shanghai (CN); Xiaoye Li, Shanghai (CN); Gang Liu, Shanghai (CN); Xianxiang Zhang, Shanghai (CN); Yingying Xu, Shanghai (CN)

(73) Assignees: SHANGHAI TIANMA MICRO-ELECTRONICS CO., LTD., Shanghai (CN); TIANMA MICRO-ELECTRONICS CO., LTD., Shenzhen (CN)

( * ) Notice: Subject to any disclaimer, the term of this patent is extended or adjusted under 35 U.S.C. 154(b) by 74 days.

(21) Appl. No.: 14/972,042

(22) Filed: Dec. 16, 2015

(65) Prior Publication Data
US 2016/0179262 A1 Jun. 23, 2016

(30) Foreign Application Priority Data

Dec. 22, 2014 (CN) .......................... 2014 1 0831207

(51) Int. Cl.
*G06F 3/041* (2006.01)
*G06F 3/044* (2006.01)

(52) U.S. Cl.
CPC ............ *G06F 3/0412* (2013.01); *G06F 3/044* (2013.01)

(58) Field of Classification Search
CPC . G06F 3/04; G06F 3/044; G06F 3/041; G06F 3/038; G06F 3/045; G02F 1/133; G02F 1/1345; G09G 3/36; G09G 5/00; G11C 19/00
See application file for complete search history.

(56) References Cited

U.S. PATENT DOCUMENTS

| 2010/0164881 | A1* | 7/2010 | Kuo ........................ G06F 3/044 345/173 |
| 2014/0132539 | A1* | 5/2014 | Huang .................. G06F 1/1643 345/173 |
| 2014/0240620 | A1* | 8/2014 | Chiu ..................... G06F 1/1626 349/12 |
| 2014/0320765 | A1* | 10/2014 | Jiang ...................... G06F 3/041 349/12 |
| 2015/0042908 | A1* | 2/2015 | Wang ..................... G06F 3/044 349/12 |

FOREIGN PATENT DOCUMENTS

| CN | 1955904 A | 5/2007 |
| CN | 103577017 A | 2/2014 |
| CN | 203588221 U | 5/2014 |

(Continued)

*Primary Examiner* — Pegeman Karimi
(74) *Attorney, Agent, or Firm* — Faegre Baker Daniels LLP (57) ABSTRACT

A display panel and a display device, where the display panel includes a display region and a frame region surrounding the display region. The display panel includes a peripheral touch structure disposed in the frame region and an internal touch structure disposed in the display region.

15 Claims, 11 Drawing Sheets

(56) References Cited

FOREIGN PATENT DOCUMENTS

| CN | 103858077 | A  | 6/2014  |
|----|-----------|----|---------|
| CN | 103926727 | A  | 7/2014  |
| CN | 104123023 | A  | 10/2014 |
| EP | 2565758   | A2 | 3/2013  |
| TW | 201024851 | A  | 7/2010  |

* cited by examiner

Related Art

TOUCH DISPLAY PANEL AND TOUCH DISPLAY DEVICE

CROSS-REFERENCE TO RELATED APPLICATION

This application claims priority to Chinese Application No. 201410831207.3, filed Dec. 22, 2014, which is herein incorporated by reference in its entirety.

TECHNICAL FIELD

The present disclosure relates to the field of display technologies and, in particular, to a display panel and a display device.

BACKGROUND

With the development of modern electronic technologies, certain structures are provided in a display panel of a display device to accomplish corresponding functions, for example a touch structure is provided for a touch function, in order to provide a user with convenience in use.

Currently, in order to reduce the thickness of the display panel and achieve the touch function, common electrodes provided in the display panel are generally multiplexed as touch electrodes (such as touch driving electrodes, or touch driving electrodes and touch sensing electrodes both located in the same layer), that is, the common electrodes are used to receive a common voltage signal in a display state, and used as the touch electrodes to receive or output touch signals (e.g. to receive touch sensing signals or output touch driving signals) in a touch state. The common electrodes can be disposed on a side of an array substrate that faces a color filter substrate or can be disposed on a side of the color filter substrate that faces the array substrate.

Figure 1:
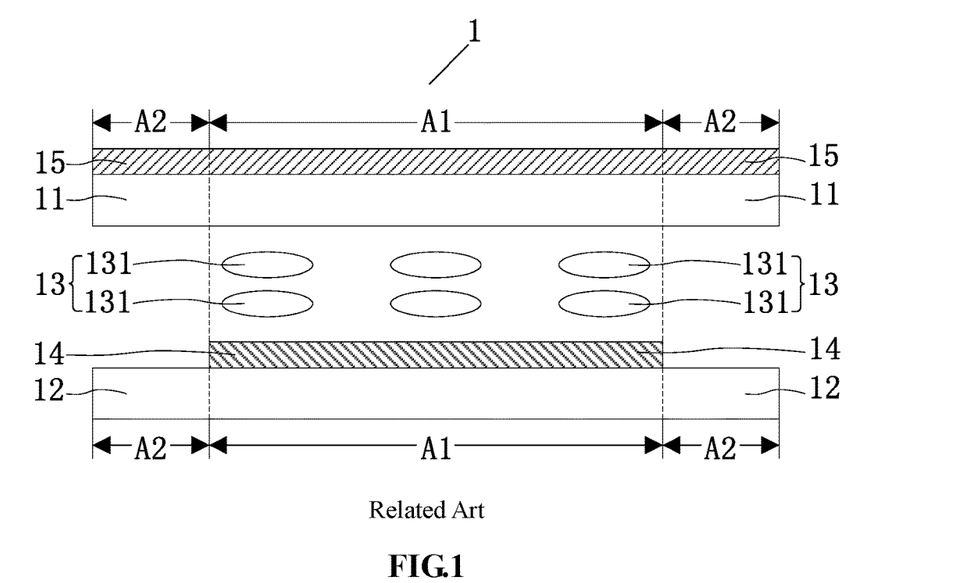
FIG. 1 is a schematic view showing the structure of a display panel in the related art.

FIG. 1 is a schematic view showing the structure of a display panel in the related art. As shown in FIG. 1, a display panel 1 includes a display region A1 and a frame region A2 surrounding the display region A1. More particularly, the display panel 1 may include a color filter substrate 11, an array substrate 12 provided opposite to the color filter substrate 11, and a liquid crystal layer 13 disposed between the color filter substrate 11 and the array substrate 12, where the liquid crystal layer 13 is formed by liquid crystal molecules 131. Common electrodes 14 are provided on a side of the array substrate 12 that faces the color filter substrate 11 and may be multiplexed as touch driving electrodes. Meanwhile, corresponding to the common electrodes 14 multiplexed as the touch driving electrodes, touch sensing electrodes 15 are provided on a side of the color filter substrate 11 that is away from the array substrate 12, to realize the touch function.

As illustrated in FIG. 1, when the display panel operates in a display state, the common electrodes 14 are configured to receive a common voltage signal to drive the liquid crystal molecules 131 to rotate, thereby realizing the display effect of the display panel. However, since the liquid crystal molecules 131 are provided in the display region A1, the common electrodes 14 for driving the liquid crystal molecules 131 are required to be provided in the display region A1 instead of the frame region A2. When the display panel operates in a touch state, the common electrodes 14 multiplexed as the touch driving electrodes are configured to receive touch driving signals, so that the touch effect is accomplished through a mutual capacitance formed between the common electrodes 14 and the touch sensing electrodes 15. As shown in FIG. 1, the touch sensing electrodes 15 are provided in both the display region A1 and the frame region A2, however, since the common electrodes multiplexed as the touch driving electrodes are provided in the display region A1 only, a touch performance in the display region A1 of the display panel is good, while a touch performance in the frame region A2 of the display panel is poor, and thus degrading the overall touch performance of the display panel.

SUMMARY

In view of this, embodiments of the disclosure provide a display panel and a display device to solve the technical problem that since the common electrodes multiplexed as the touch driving electrodes are provided in the display region only, touch performance in the frame region of the display panel is poor, and thus degrading the overall touch performance of the display panel.

In a first example, embodiments of the disclosure provide a display panel which is constituted by a display region and a frame region surrounding the display region, and the display panel includes a peripheral touch structure disposed in the frame region and an internal touch structure disposed in the display region.

In a second example, embodiments of the disclosure provide a display device including the display panel mentioned in the first example.

While multiple embodiments are disclosed, still other embodiments of the disclosure will become apparent to those skilled in the art from the following detailed description, which shows and describes illustrative embodiments of the disclosure. Accordingly, the drawings and detailed description are to be regarded as illustrative in nature and not restrictive.

BRIEF DESCRIPTION OF THE DRAWINGS

Other features, objects and advantages of the disclosure will become more apparent from the detailed description of non-limiting embodiments made below with reference to the accompany drawings, in which.

While the disclosure is amenable to various modifications and alternative forms, specific embodiments have been shown by way of example in the drawings and are described in detail below. The intention, however, is not to limit the disclosure to the particular embodiments described. On the contrary, the disclosure is intended to cover all modifications, equivalents, and alternatives falling within the scope of the disclosure as defined by the appended claims.

DETAILED DESCRIPTION

The disclosure will be described in detail through embodiments below in conjunction with the accompanying drawings. It should be understood that specific embodiments described herein are merely for explaining the disclosure rather than limiting the disclosure. In addition, it should be noted that merely partial content associated with the disclosure rather than all content is illustrated in the accompanying drawings.

The touch structure for achieving the touch function is summarized below before embodiments of the disclosure are provided. With regard to the design for a touch structure, an electromagnetic touch structure and a capacitive touch structure may be mainly employed to achieve the touch function, where the electromagnetic touch structure includes two coils which are arranged in two different directions to realize the electromagnetic touch function; and the capacitive touch structure includes one type of electrode (such as touch sensing electrodes) or two different types of electrodes (such as touch driving electrodes and touch sensing electrodes) to achieve the capacitive touch function through a self-capacitance formed between the touch sensing electrodes and the ground or through a mutual capacitance formed between the touch driving electrodes and the touch sensing electrodes. Since the technical solutions of the disclosure are mainly directed to the capacitive touch structure, the capacitive touch structure will be mainly described in detail as follows.

The two different types of electrodes in the capacitive touch structure mentioned above may be disposed in the same layer as desired, and in this case, the two different types of electrodes may be disposed in parallel and spaced from each other or may be intersected with each other, and in the latter case, the electrodes extend across one another by bridges at the intersections. Alternatively, the two different types of electrodes may be disposed on different layers as desired, and in this case, the two different types of electrodes are usually configured to be intersected with each other.

Accordingly, given the introduction to the capacitive touch structure mentioned above and the technical problems existing in the related art, the technical solutions of embodiments of the disclosure are given as follows.

Figure 2:
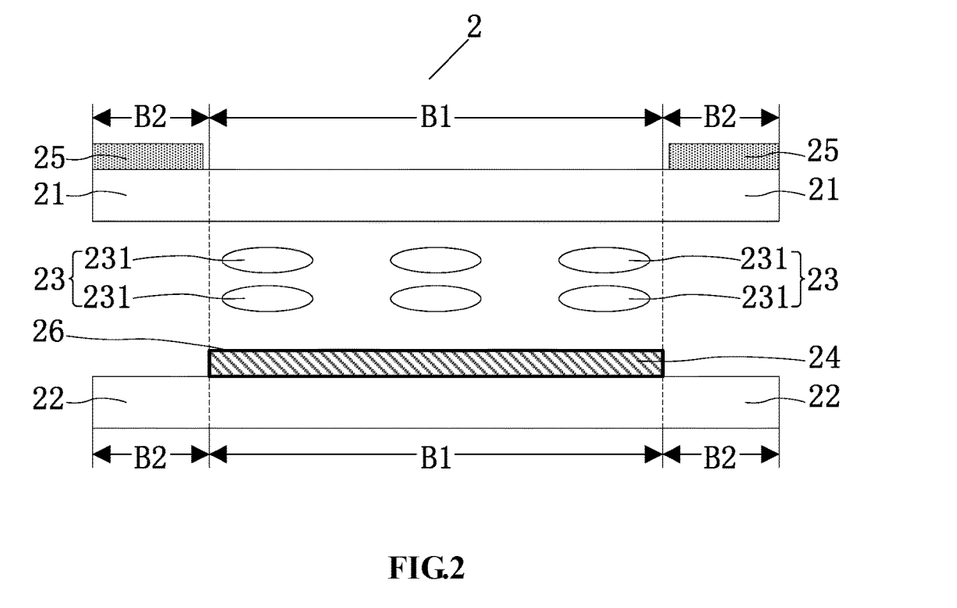
FIG. 2 is a schematic view showing the structure of a display panel, according to embodiments of the disclosure.

Embodiments of the disclosure provide a display panel. FIG. 2 is a schematic view showing the structure of a display panel, according to embodiments of the disclosure. As shown in FIG. 2, a display panel 2 includes a display region B1 and a frame region B2 surrounding the display region B1, and further includes a peripheral touch structure 25 provided in the frame region B2 and an internal touch structure 24 provided in the display region B1.

Given that the internal touch structure 24 is provided in the display region B1 and the peripheral touch structure 25 is provided in the frame region B2, a good touch performance of the display region B1 can be ensured and the touch performance of the frame region B2 can be improved, thereby advantageously improving the overall touch performance of the display panel.

In this embodiment of the present disclosure, the peripheral touch structure 25 is insulated from the internal touch structure 24 and is configured to receive a peripheral touch driving signal and a peripheral touch sensing signal is generated due to a self-capacitance or a mutual capacitance in the peripheral touch structure when a touch occurs in the frame region B2, and subsequently, the position of a touch point in the frame region B2 can be determined by processing the peripheral touch sensing signal, and the internal touch structure 24 is configured to receive an internal touch driving signal, and an internal touch sensing signal is generated due to a mutual capacitance in the internal touch structure when a touch occurs in the frame region B2, and subsequently, the position of a touch point in the frame region B2 can also be determined by processing the internal touch sensing signal, wherein the internal touch sensing signal is different from the peripheral touch sensing signal. Further, the peripheral touch driving signal received by the peripheral touch structure 25 is different from the internal touch driving signal received by the internal touch structure 24.

As described above, the peripheral touch structure 25 and the internal touch structure 24 are insulated from each other, and can receive or generate different touch signals, such that the peripheral touch structure 25 and the internal touch structure 24 can operate independently to achieve the corresponding respective touch functions. Therefore in use, the peripheral touch structure may not operate simultaneously with the internal touch structure, instead, the operation state of the peripheral touch structure can be controlled as desired to be turned on or off, thereby reducing the power consumption of the touch panel in the touch state. Meanwhile, since the frame region B2 is located at the periphery of the display panel, the effect of a self-capacitance or a mutual capacitance of the peripheral touch structure 25 is relatively weaker than that of the internal touch structure 24, and thus, the peripheral touch driving signal applied to the peripheral touch structure 25 may be enhanced properly to make the touch function at the frame region B2 more sensitive, so as to obtain a better touch effect.

Figure 3A:
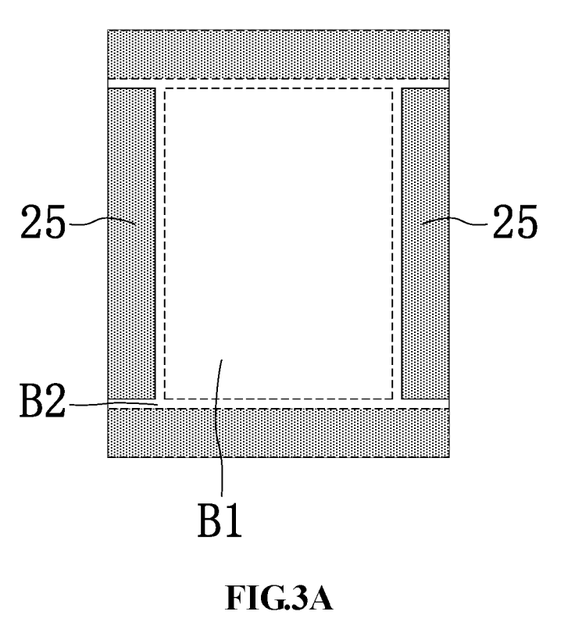
FIG. 3A is a schematic top view of the display panel in FIG. 2.
Figure 3B:
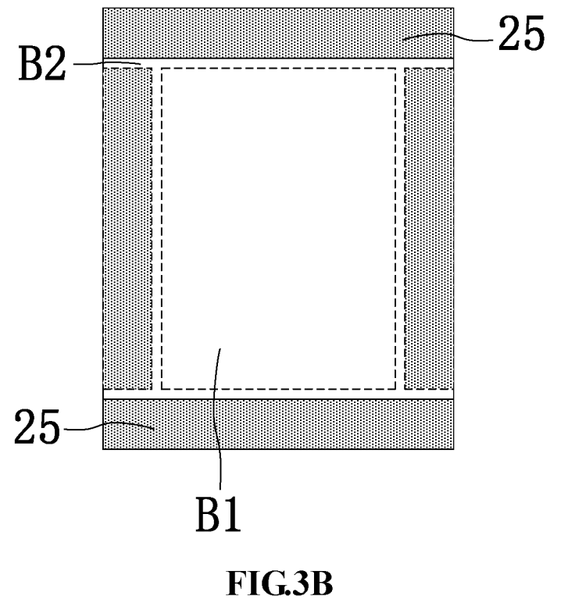
FIG. 3B is another schematic top view of the display panel in FIG. 2.

As shown in FIG. 2, the display panel further includes a color filter substrate 21, an array substrate 22 arranged opposite to the color filter substrate 21, and a liquid crystal layer 23 disposed between the color filter substrate 21 and the array substrate 22, where the liquid crystal layer 23 is formed by liquid crystal molecules 231. As shown in FIG. 2, the internal touch structure 24 is provided on a side of the array substrate 22 that faces the color filter substrate 21, the peripheral touch structure 25 is provided on a side of the color filter substrate 21 that is away from the array substrate 22, and the peripheral touch structure 25 is provided at least in the frame regions B2 located at two opposite sides of the display region B1. FIG. 3A is a schematic top view of the display panel in FIG. 2. As shown in FIG. 3A, the peripheral touch structure 25 is provided in the frame regions B2 located at the left and right sides of the display region B1, and the peripheral touch structure 25 can also be provided in the dashed area enclosed by the dashed lines, that is, in addition to the frame regions B2 located at the left and right sides of the display region B1, the peripheral touch structure 25 may also be arranged below and/or above the display region B1. FIG. 3B is another top view of the display panel in FIG. 2. As shown in FIG. 3B, the peripheral touch structure 25 is provided in the frame regions B2 located above and below the display region B1, and the peripheral touch structure 25 can also be provided in the dashed area enclosed by the dashed lines, that is, in addition to the frame regions B2 located above and below the display region B1, the peripheral touch structure 25 may further be provided at the left and/or right sides of the display region B1. By providing the peripheral touch structure 25 in the above frame region B2, the touch performance of the frame region B2 can be improved when a touch occurs in the frame region B2.

Although the peripheral touch structure 25 is provided at least in the frame regions B2 located at opposite sides of the display region B1 in FIG. 2, the peripheral touch structure 25 may also be provided in the frame regions B2 at any one, two, three, or four sides of the display region B1.

The peripheral touch structure 25 shown in FIG. 2 may include a plurality of first touch electrodes and a plurality of second touch electrodes, and the first touch electrodes and the second touch electrodes are both provided on a side of the color filter substrate 21 that is away from the array substrate 22. Next, the peripheral touch structure 25 shown in FIG. 2 will be described in detail below in the case of including the plurality of first touch electrodes and the plurality of second touch electrodes.

Figure 4A:
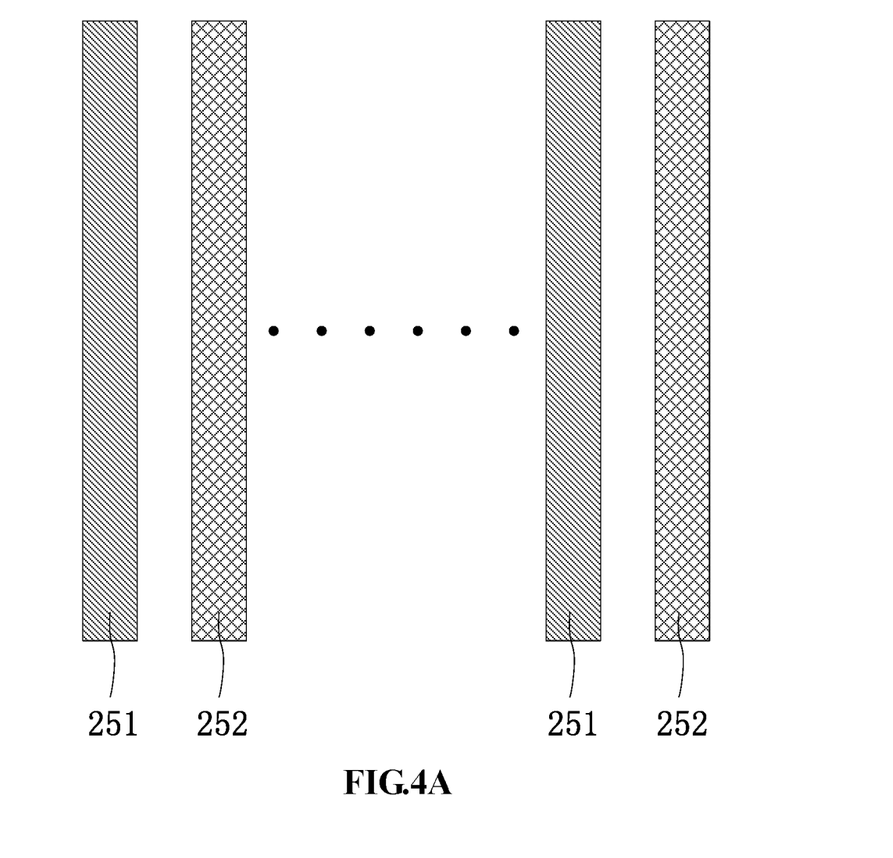
FIG. 4A is a schematic view showing the structure of a peripheral touch structure of the display panel in FIG. 2.

The first touch electrodes and the second touch electrodes included in the peripheral touch structure 25 shown in FIG. 2 may be located in the same layer and disposed in parallel and spaced from each other. As shown in FIG. 4, the peripheral touch structure includes a plurality of first touch electrodes 251 and a plurality of second touch electrodes 252, where the first touch electrodes 251 and the second touch electrodes 252 have a strip shape, and are located in the same layer and are disposed in parallel and spaced from each other in a horizontal direction.

Figure 4B:
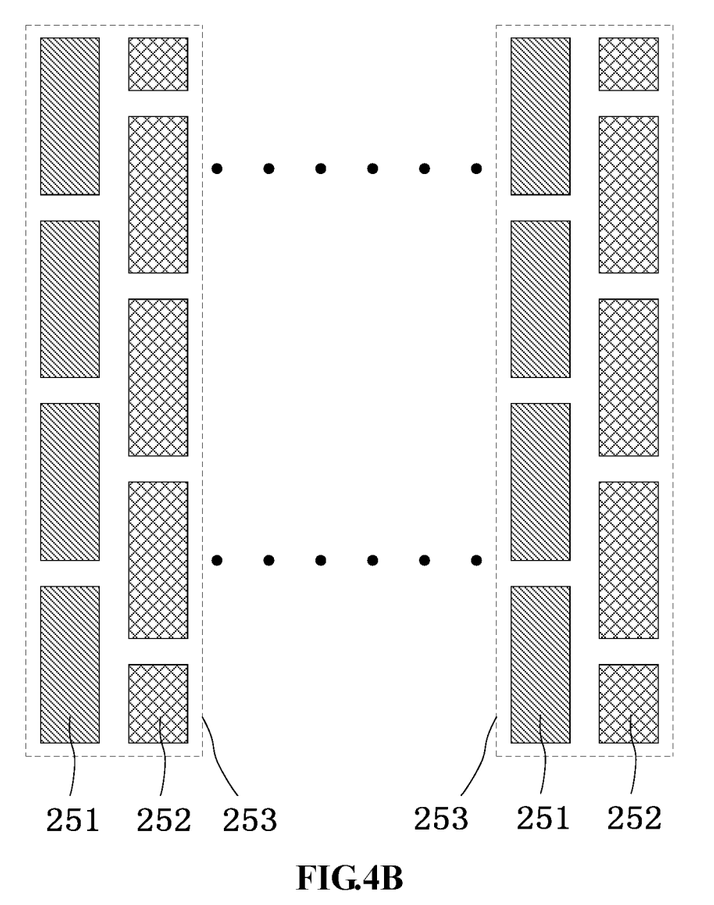
FIG. 4B is a schematic view showing another structure of the peripheral touch structure of the display panel in FIG. 2.
Figure 4C:
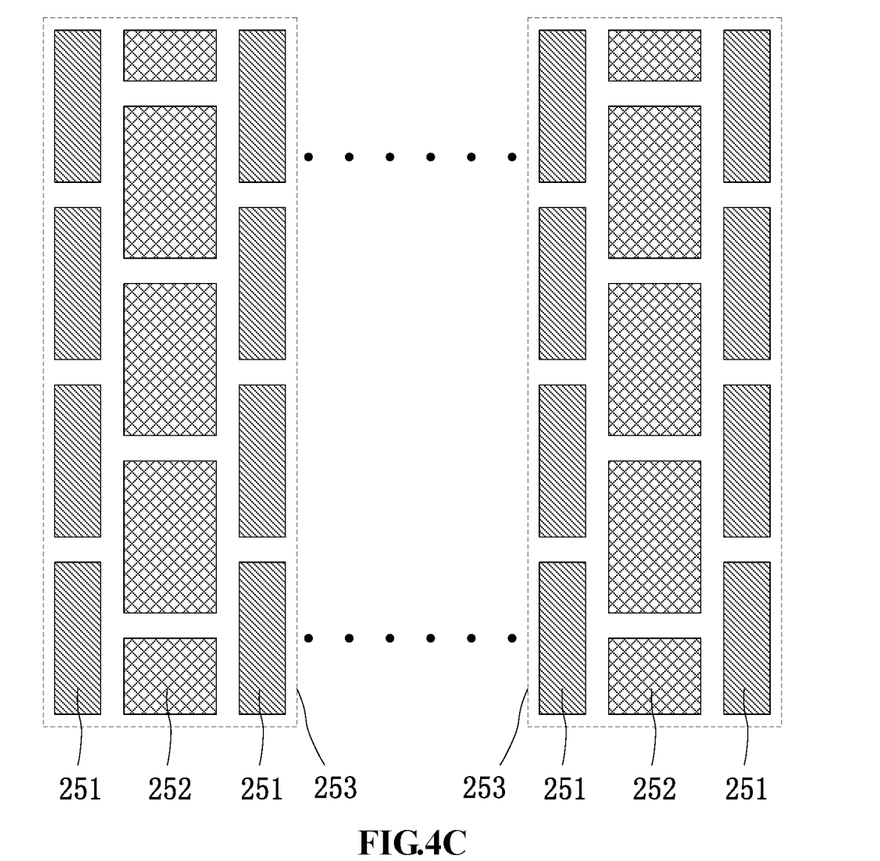
FIG. 4C is a schematic view showing still another structure of the peripheral touch structure of the display panel in FIG. 2.

In addition to the strip shape, the first touch electrodes 251 and the second touch electrodes 252 may also have a block shape or other shapes. As shown in FIG. 4B, the peripheral touch structure 25 can include a plurality of first touch electrodes 251 and a plurality of second touch electrodes 252, where the first touch electrodes 251 and the second touch electrode 252 have a bar shape, and are disposed in parallel and spaced from each other in a horizontal direction. Each column of first touch electrodes 251 include a plurality of first touch electrodes 251, each column of second touch electrodes 252 include a plurality of second touch electrodes 252, and every two adjacent columns of second touch electrodes 252 are spaced by one column of first touch electrodes 251. In embodiments, a column of second touch electrodes 252 and a column of first touch electrodes 251 located adjacently at the left side of the column of second touch electrodes 252 form a touch electrode group 253, and the peripheral touch structure includes at least one such touch electrode group 253. Alternatively, as shown in FIG. 4C, the peripheral touch structure 25 includes a plurality of first touch electrodes 251 and a plurality of second touch electrodes 252, where the first touch electrodes 251 and the second touch electrodes 252 have a block shape, and are disposed in parallel and spaced from each other in a horizontal direction. Each column of first touch electrodes 251 include a plurality of first touch electrodes 251, each column of second touch electrodes 252 include a plurality of second touch electrodes 252, and every two adjacent columns of second touch electrodes 252 are spaced by two columns of first touch electrodes 251. In embodiments, a column of second touch electrodes 252 and two columns of first touch electrodes 251, respectively located adjacently at two sides of the column of second touch electrodes 252, form a touch electrode group 253, and the peripheral touch structure includes at least one such touch electrode group 253.

It should be noted that, if the first touch electrodes 251 and the second touch electrodes 252 shown in FIG. 4B or FIG. 4C are disposed in parallel and spaced from each other in a longitudinal direction instead of the horizontal direction, as like in FIG. 4B, a row of second touch electrodes and a row of first touch electrodes adjacent to the row of second touch electrodes may form a touch electrode group; and as like in FIG. 4C, a row of second touch electrodes and two rows of first touch electrodes respectively disposed adjacently at two sides of the row of second touch electrodes may form a touch electrode group. In the above two cases, the peripheral touch structure includes at least one such touch electrode group as formed.

It should be noted that the first touch electrodes 251 and the second touch electrodes 252 in FIGS. 4A, 4B and 4C may be the same type of electrodes, e.g. touch sensing electrodes, and in this case, the capacitive touch function is achieved by a self-capacitance in the peripheral touch structure. Alternatively, the first touch electrodes 251 may be of a type different from that of the second touch electrodes in FIGS. 4A and 4B, that is, the first touch electrodes 251 function as touch driving electrodes, and accordingly the second touch electrodes 252 function as touch sensing electrodes; or the first touch electrodes 251 function as touch sensing electrodes, and accordingly the second touch electrodes 252 function as touch driving electrodes. Alternatively, in FIG. 4C, the first touch electrodes 251 may also be of a type different from that of the second touch electrodes 252, and preferably the first touch electrodes 251 function as touch driving electrodes and the second touch electrodes 252 function as touch sensing electrodes, and in this case, the capacitive touch function is achieved through a mutual capacitance of the peripheral touch structure.

Figure 5A:
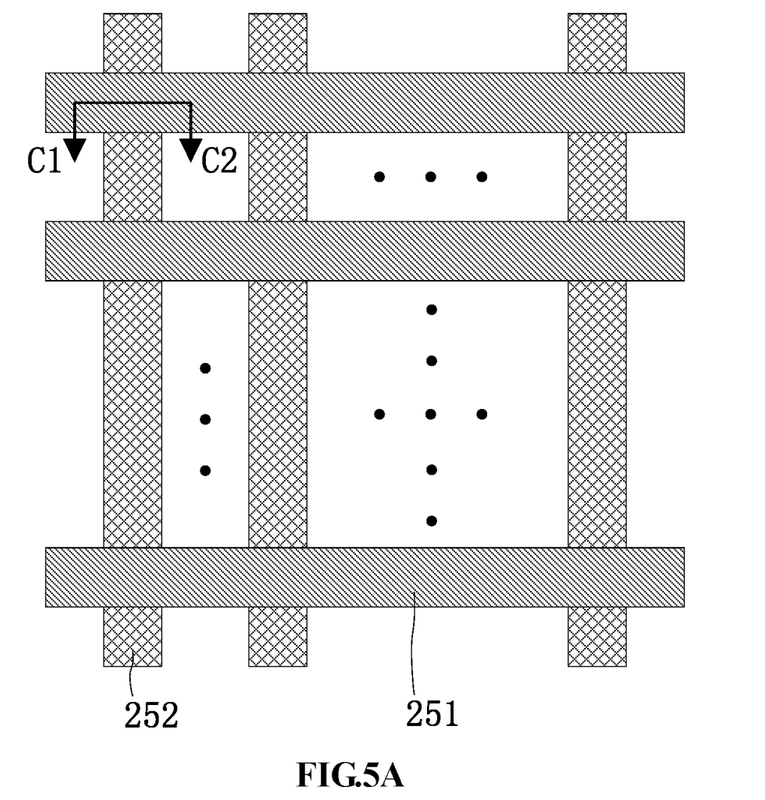
FIG. 5A is a schematic view showing still another structure of the peripheral touch structure of the display panel in FIG. 2.
Figure 5B:
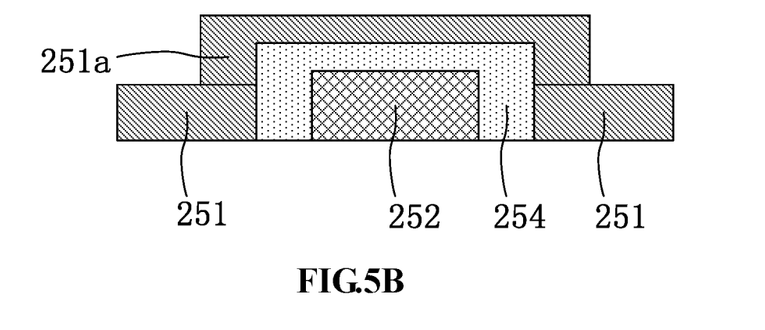
FIG. 5B is a schematic sectional view showing the structure of the display panel in FIG. 5A along a direction C1-C2.

It has been described above that the first touch electrodes and the second touch electrodes included in the peripheral touch structure 25 of FIG. 2 are located in the same layer and are provided in parallel and spaced from each other. However, the first touch electrodes and the second touch electrodes may also be located in the same layer and intersected with other each. As shown in FIG. 5A, the first touch electrodes 251 are disposed in parallel with each other and spaced from each other in a longitudinal direction, the second touch electrodes 252 are disposed in parallel with each other and spaced from each other in a horizontal direction, the first touch electrodes 251 and the second touch electrodes 252 are located in the same layer and are intersected with other each, and the first touch electrodes 251 are electrically insulated from the second touch electrodes 252. FIG. 5B is a schematic sectional view showing the structure of the display panel in FIG. 5A along a direction C1-C2. As shown in FIG. 5B, the first touch electrode 251 runs across the second touch electrode 252 by a bridge 251a at an intersection between the first touch electrode 251 and the second touch electrode 252, and are electrically insulated from the second touch electrode 252 by a first insulation layer 254. It should be noted that, in embodiments, the arrangements of the first touch electrodes 251 and the second touch electrodes 252 described above are employed in the case that the first touch electrodes 251 are of a type different from that of the second touch electrodes 252, that is, the first touch electrodes are touch driving electrodes and accordingly the second touch electrodes are touch sensing electrodes; or the first touch electrodes are touch sensing electrodes and accordingly the second touch electrodes are touch driving electrodes, and in this case, the capacitive touch function is achieved through a mutual capacitance in the peripheral touch structure.

Figure 6A:
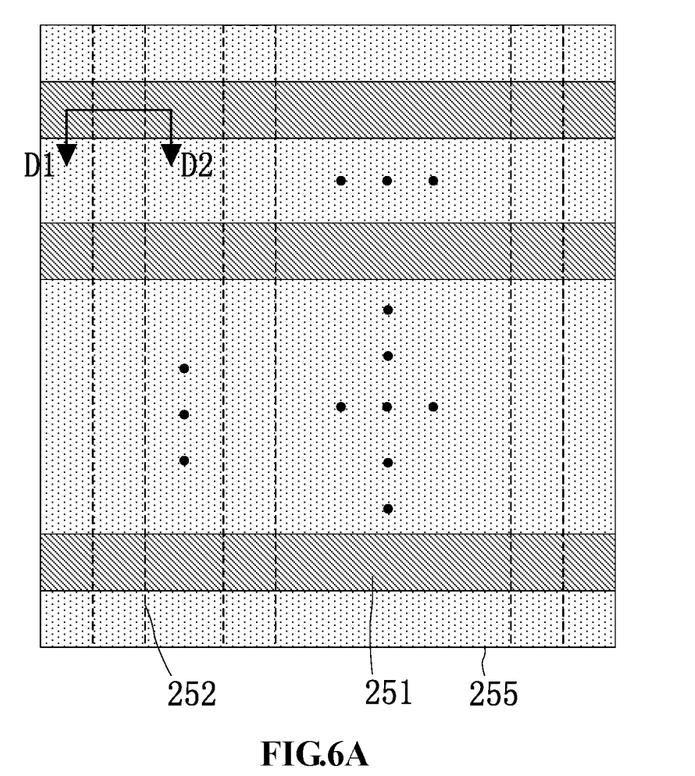
FIG. 6A is a schematic view showing still another structure of the peripheral touch structure of the display panel in FIG. 2.
Figure 6B:
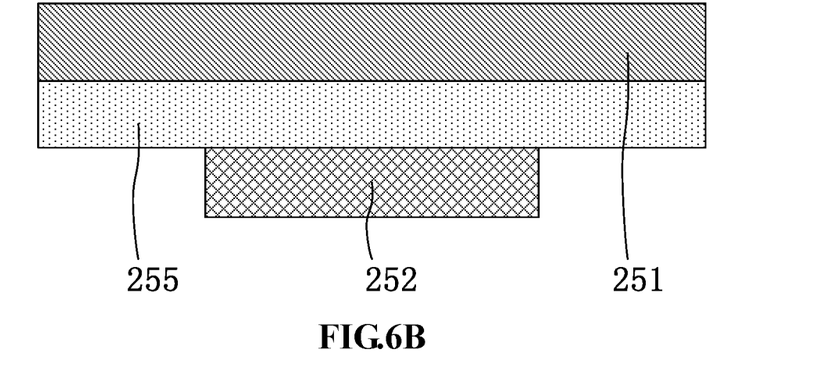
FIG. 6B is a schematic sectional view showing the structure of the display panel in FIG. 6A along a direction D1-D2.

It has been described above that the first touch electrodes and the second touch electrodes included in the peripheral touch structure 25 of FIG. 2 are located in the same layer. However, the first touch electrodes and the second touch electrodes may be respectively located in different layers. As shown in FIG. 6A, the first touch electrodes 251 are disposed in parallel with each other and spaced from each other in a longitudinal direction, the second touch electrodes 252 are disposed in parallel with each other and spaced from each other in a horizontal direction, the first touch electrodes 251 are located above the second touch electrodes 252 and intersected with the second touch electrodes 252, and further are electrically insulated from the second touch electrodes 252 by a second insulation layer 255. FIG. 6B is a schematic sectional view showing the structure of the display panel in FIG. 6A along a direction D1-D2. As shown in FIG. 6B, the first touch electrodes 251 are located above the second touch electrodes 252 and electrically insulated from the second touch electrodes 252 by the second insulation layer 255. It should be noted that, in embodiments, such arrangement of the first touch electrodes 251 and the second touch electrodes 252 is employed in the case that the first touch electrodes are of a type different from that of the second touch electrodes, that is, the first touch electrodes are touch driving electrodes and accordingly the second touch electrodes are touch sensing electrodes, or the first touch electrodes are touch sensing electrodes and accordingly the second touch electrodes are touch driving electrodes, and in this case, the capacitive touch function is achieved through a mutual capacitance in the peripheral touch structure.

Figure 7A:
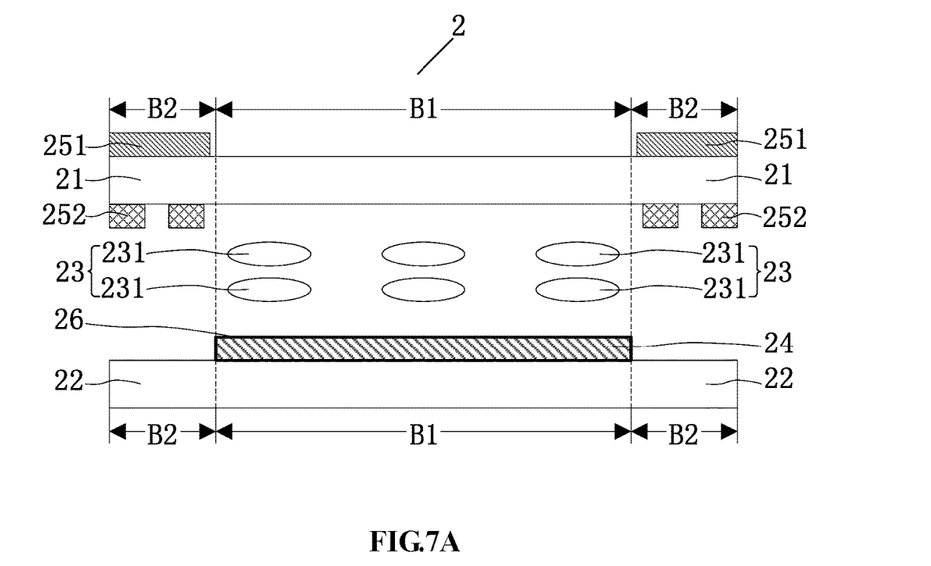
FIG. 7A is a schematic view showing the structure of another display panel, according to embodiments of the disclosure.
Figure 7B:
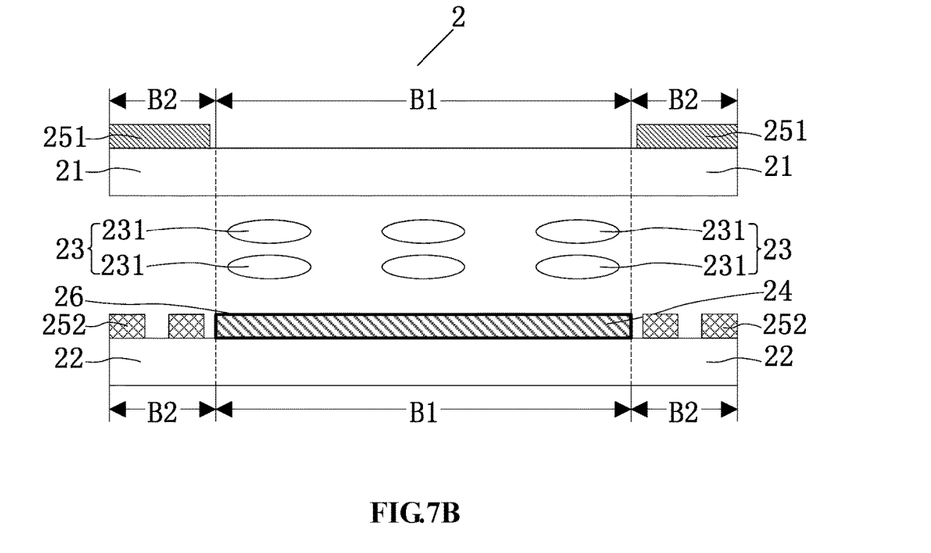
FIG. 7B is a schematic view showing the structure of still another display panel, according to embodiments of the disclosure.

As described above, a plurality of first touch electrodes and a plurality of second touch electrodes are provided on a side of the color filter substrate that is away from the array substrate, and are used to form a peripheral touch structure in order to improve the touch performance of the frame region, thereby advantageously improving the overall touch performance of the display panel. However, the first touch electrodes 251 and the second touch electrodes 252 may also be arranged at other positions, for example, as shown in FIG. 7A, the first touch electrodes 251 are disposed on a side of the color filter substrate 21 that is away from the array substrate 22, and the second touch electrodes 252 are disposed on a side of the color filter 21 that faces the array substrate 22; as shown in FIG. 7B, it is different from FIG. 7A in that the second touch electrodes 252 are disposed on a side of the array substrate 22 that faces the color filter substrate 21; similarly, the first touch electrodes may be disposed on a side of the color filter substrate that faces the array substrate or may be disposed on a side of the array substrate that faces the color filter substrate, and accordingly, the second touch electrodes may be disposed on a side of the color filter substrate that is away from or faces the array substrate, or the second touch electrodes may also be disposed on a side of the array substrate that faces the color filter substrate, where the second touch electrodes are electrically insulated from the first touch electrodes; alternatively, the positions of the first touch electrodes may be interchanged with the positions of the second touch electrodes, and so on. With such arrangements of the first touch electrodes and the second touch electrodes, the peripheral touch structure as obtained has a better touch performance at the frame region, thereby advantageously improving the overall touch performance of the display panel.

As can be seen from the above, the arrangement of the peripheral touch structure can improve the touch performance at the frame region. In addition, the overall touch performance of the display panel is also related with an internal touch structure in the display region. Next, on the basis of the above arrangement of the peripheral touch structure, the arrangement of the internal touch structure is described in detail below.

As shown in FIG. 2, the display panel 2 further includes a common electrode layer 26 located in the display region, where the common electrode layer 26 includes the internal touch structure 24. The common electrode layer 26 is configured to receive a common voltage signal in a display state, and receive the internal touch driving signal or output the internal touch sensing signal in a touch state. It should be noted that one type of electrode (functioning as touch sensing electrodes, for example) may be provided in the internal touch structure 24 to achieve the capacitive touch function through a self-capacitance, or alternatively, two different types of electrodes (functioning as touch driving electrodes and touch sensing electrodes, respectively, for example) may be provided in the internal touch structure 24 to achieve the capacitive touch function through a mutual capacitance, and reference may be made to specific details given in the case in which the peripheral touch structure 25 includes the first touch electrodes and the second touch electrodes.

As shown in FIG. 2, the common electrode layer 26 is provided on a side of the array substrate 22 that faces the color filter substrate 21, and in this case, the display panel can employ a Fringe Field Switching (FFS) or In-Plane Switching mode (IPS) type liquid crystal driving mode. Moreover, the display panel may further employ a Twisted Nematic (TN) type liquid crystal driving mode, and hence the corresponding common electrode layer is required to be provided on a side of the color filter substrate that faces the array substrate.

Figure 8:
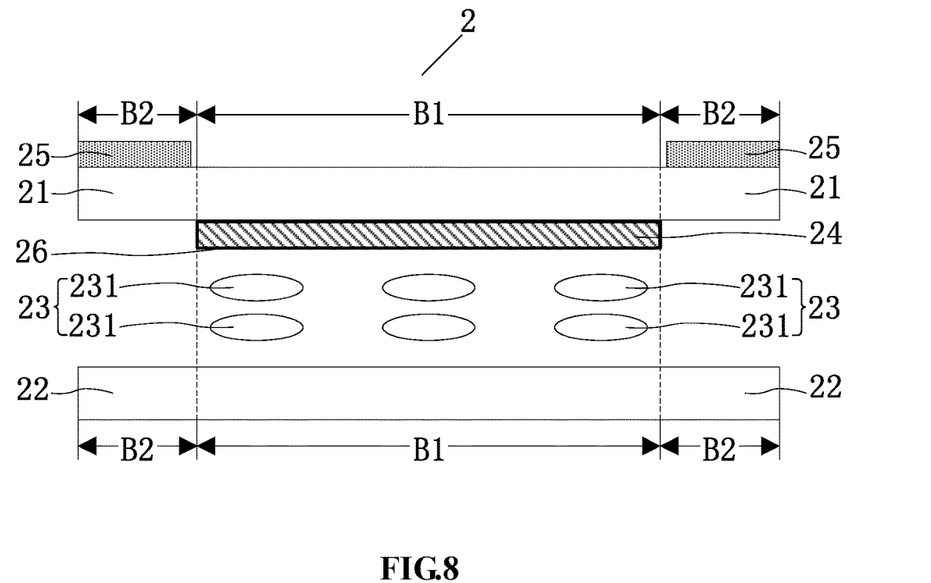
FIG. 8 is a schematic view showing the structure of still another display panel, according to embodiments of the disclosure.

FIG. 8 is a schematic view showing the structure of still another display panel, according to embodiments of the disclosure. As shown in FIG. 8, a common electrode layer 26 is provided on a side of a color filter substrate 21 that faces an array substrate 22, where the common electrode layer 26 includes an internal touch structure 24. The common electrode layer 26 is configured to receive a common voltage signal in a display state, and receive the internal touch driving signal or output the internal touch sensing signal in a touch state. The description with respect to the internal touch structure 24 in FIG. 8 is not given herein and reference can be made to the description with respect to the internal touch structure 24 in FIG. 2.

Figure 9A:
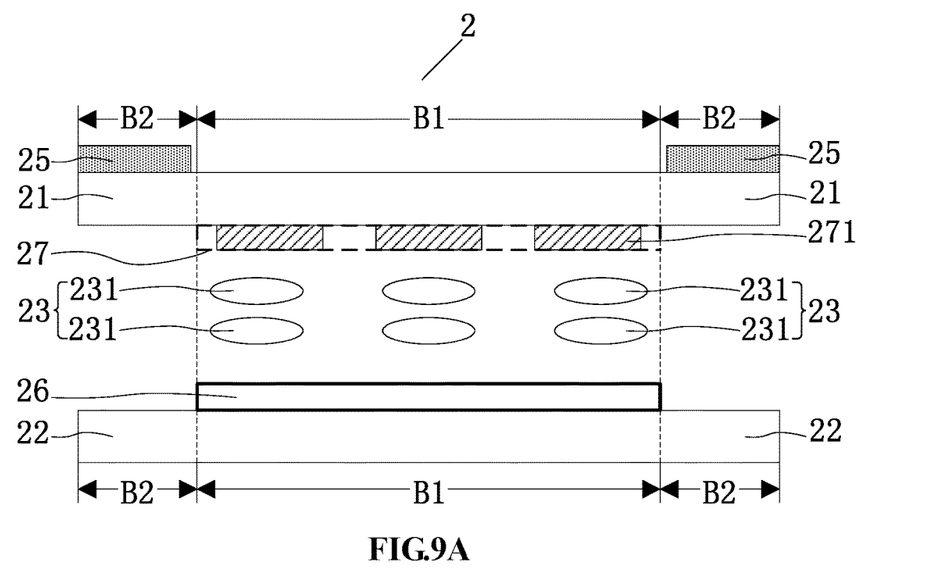
FIG. 9A is a schematic view showing the structure of still another display panel, according to embodiments of the disclosure.

If the internal touch structure is configured to include two different types of electrodes (e.g. the touch driving electrodes and the touch sensing electrodes) to achieve the capacitive touch function through a mutual capacitance, the following arrangement described below may also be employed, other than the arrangements shown in FIGS. 2 and 8. As shown in FIG. 9A, the display panel 2 includes a common electrode layer 26 and a third touch layer 27 located in the display region B1 thereof, where the third touch layer 27 includes a plurality of third touch electrodes 271, and the common electrode layer 26 and the third touch layers 27 together form an internal touch structure. The common electrode layer 26 is configured to receive a common voltage signal in a display state, and receive the internal touch driving signal in a touch state. As shown in FIG. 9A, the third touch layer 27 is disposed on a side of the color filter substrate 21 that faces the array substrate 22, which is only an example of the arrangement of the third touch layer 27. In another example, as show in FIG. 9B, the third touch layer 27 may also be disposed on a side of the color filter substrate 21 that is away from the array substrate 22.

Figure 9B:
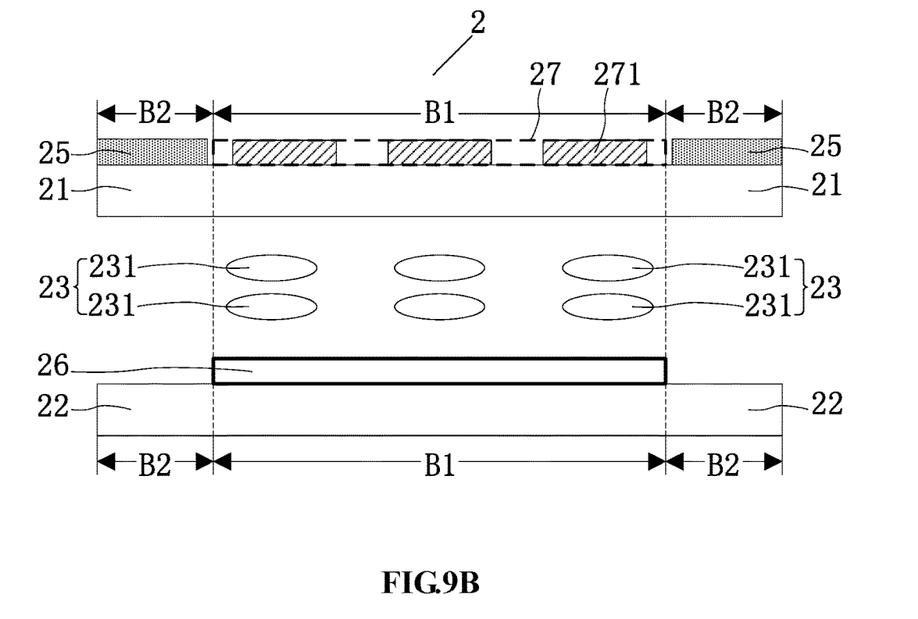
FIG. 9B is a schematic view showing the structure of still another display panel, according to embodiments of the disclosure.
Figure 9C:
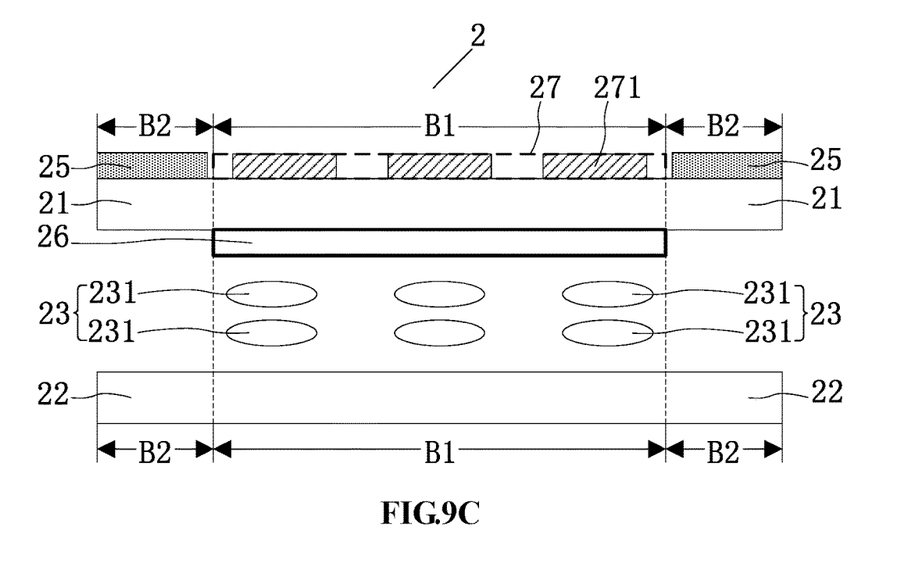
FIG. 9C is a schematic view showing the structure of still another display panel, according to embodiments of the disclosure.

FIGS. 9A and 9B show the internal touch structure comprised of the common electrode layer 26 and the third touch layer 27 in the display panel which employs the FFS type liquid crystal driving mode or the IPS type liquid crystal driving mode. However, FIG. 9C shows the case in which the display panel employs the TN type liquid crystal driving mode. As shown in FIG. 9C, a common electrode layer 26 located in the display region B1 is disposed on a side of the color filter substrate 21 that faces the array substrate 22, and the common electrode layer 26 and a third touch layer 27 including a plurality of third touch electrodes 271 together form an internal touch structure. In some embodiments, the third touch layer 27 is disposed on a side of the color filter substrate 21 that is away from the array substrate 22.

It should be noted that the various arrangements of the internal touch structure described above can be combined together with the various arrangements of the peripheral touch structure to form an internal touch structure of the display panel, thereby improving the overall touch performance of the display panel.

Moreover, in the internal touch structure and the peripheral touch structure described above, if the internal touch structure includes a common electrode layer and a third touch layer, the first touch electrodes and/or the second touch electrodes included in the peripheral touch structure may be located at the same layer as the third touch electrodes located in the third touch layer, and thus the first touch electrodes and/or the second touch electrodes can be manufactured in the manufacturing process of the third touch electrode in the display region, thereby simplifying the manufacturing process and reducing the cost.

Figure 10:
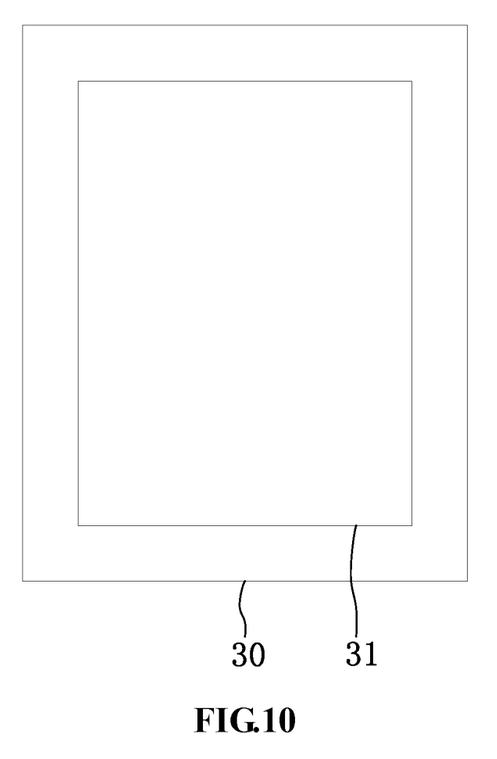
FIG. 10 is a schematic view showing the structure of a display device, according to embodiments of the disclosure.

Embodiments of the disclosure further provide a display device. FIG. 10 is a schematic view showing the structure of a display device, according to embodiments of the disclosure. As shown in FIG. 10, a display device 30 includes a display panel 31, and also includes a driving circuit and other means used for supporting the normal operation of the display device 30. Here, the display panel 31 is the one described in any of the above embodiments, and the display device 30 may be one of a mobile phone, a desktop computer, a notebook computer, a tablet computer and an electronic paper.

According to the display panel and the display device provided in the disclosure, a peripheral touch structure is provided in the frame region and an internal touch structure is provided in the display region, so that, the touch performance of the frame region can be improved while maintaining the touch performance of the display region, thereby advantageously improving the overall touch performance of the display panel and further improving the overall touch performance of the display device.

It should be noted that the embodiments of the disclosure and the technical principles used therein are described as above. It should be appreciated that the disclosure is not limited to the particular embodiments described herein, and any apparent alterations, modification and substitutions can be made by those skilled in the art without departing from the scope of protection of the disclosure. Accordingly, while the disclosure is described in detail through the above embodiments, the disclosure is not limited to the above embodiments and can further include other additional embodiments without departing from the scope of the disclosure Various modifications and additions can be made to the exemplary embodiments discussed without departing from the scope of the disclosure. For example, while the embodiments described above refer to particular features, the scope of this disclosure also includes embodiments having different combinations of features and embodiments that do not include all of the described features. Accordingly, the scope of the disclosure is intended to embrace all such alternatives, modifications, and variations as fall within the scope of the claims, together with all equivalents thereof.

We claim:

1. A touch display panel, comprising:
a display region;
a frame region surrounding the display region;
a peripheral touch structure disposed in the frame region; and
an internal touch structure disposed in the display region,
wherein the peripheral touch structure is insulated from the internal touch structure, the peripheral touch structure is configured to receive a peripheral touch driving signal and generate a peripheral touch sensing signal, and the internal touch structure is configured to receive an internal touch driving signal and generate an internal touch sensing signal different from the peripheral touch sensing signal; and
the peripheral touch driving signal received by the peripheral touch structure is different from the internal touch driving signal received by the internal touch structure.

2. The touch display panel of claim 1, wherein the peripheral touch structure is provided in the frame region at one, two, three or four sides of the display region.

3. The touch display panel of claim 1, wherein the peripheral touch structure comprises a plurality of first touch electrodes and a plurality of second touch electrodes; the display panel comprises a color filter substrate and an array substrate arranged opposite to the color filter substrate, and the first touch electrode is disposed on a side of the color filter substrate or is disposed on a side of the array substrate that faces the color filter substrate; and the second touch electrode is disposed on a side of the color filter substrate or is disposed on a side of the array substrate that faces the color filter substrate.

4. The touch display panel of claim 3, wherein the first touch electrodes and the second touch electrodes are located in the same layer and are disposed in parallel and spaced from each other.

5. The touch display panel of claim 4, wherein a row of second touch electrodes and a row of first touch electrodes adjacent to the row of second touch electrodes form a touch electrode group; or a column of second touch electrodes and a column of first touch electrodes adjacent to the column of second touch electrodes form a touch electrode group.

6. The touch display panel of claim 5, comprising at least one the touch electrode group.

7. The touch display panel of claim 4, wherein
a row of second touch electrodes and two rows of first touch electrodes respectively disposed adjacently at two sides of the row of second touch electrodes form a first touch electrode group; or
a column of second touch electrodes and two columns of first touch electrodes respectively disposed adjacently at two sides of the column of second touch electrodes form a second touch electrode group.

8. The touch display panel of claim 3, wherein the first touch electrodes are arranged to be intersected with the second touch electrodes.

9. The touch display panel of claim 1, further comprising:
a common electrode layer located in the display region, wherein the common electrode layer comprises the internal touch structure; and
in a display state, the common electrode layer is configured to receive a common voltage signal, and in a touch state, the common electrode layer is configured to receive the internal touch driving signal or output the internal touch sensing signal.

10. The touch display panel of claim 9, further comprising an array substrate;
and a color filter substrate disposed opposite to the array substrate; wherein, the common electrode layer is disposed on a side of the color filter substrate that faces the array substrate or is disposed on a side of the array substrate that faces the color filter substrate.

11. The touch display panel of claim 1, further comprising:
a common electrode layer and a third touch layer located in the display region, wherein the third touch layer comprises a plurality of third touch electrodes, and the common electrode layer and the third touch layer form the internal touch structure; and
the common electrode layer is configured to receive a common voltage signal in a display state, and receive the internal touch driving signal in a touch state.

12. The touch display panel of claim 11, further comprising an array substrate; and
a color filter substrate disposed opposite to the array substrate; wherein the third touch electrodes are disposed on a side of the color filter substrate that faces the array substrate or is disposed on a side of the color filter substrate that is away from the array substrate.

13. The touch display panel of claim 12, wherein the peripheral touch structure comprises a plurality of first touch electrodes and a plurality of second touch electrodes, wherein the plurality of first touch electrodes and/or the plurality of second touch electrodes are located in the same layer as the plurality of third touch electrodes.

14. A touch display device, comprising a touch display panel comprising:
a display region;
a frame region surrounding the display region;
a peripheral touch structure disposed in the frame region; and
an internal touch structure disposed in the display region, wherein the peripheral touch structure is insulated from the internal touch structure, the peripheral touch structure is configured to receive a peripheral touch driving signal and generate a peripheral touch sensing signal, and the internal touch structure is configured to receive an internal touch driving signal and generate an internal touch sensing signal different from the peripheral touch sensing signal; and
the peripheral touch driving signal received by the peripheral touch structure is different from the internal touch driving signal received by the internal touch structure.

15. The touch display panel of claim 7, comprising at least one of the first and the second touch electrode groups.

* * * * *